United States Patent
Guillen et al.

[11] Patent Number: 5,838,980
[45] Date of Patent: Nov. 17, 1998

[54] COMPILATION AND VIRTUAL MACHINE ARRANGEMENT AND PROCESS FOR SOURCE CODE INCLUDING PRE-RUNTIME EXECUTABLE LANGUAGE STRUCTURE CONSTRUCTS

[75] Inventors: Juan Guillen, Russell; James M. Leask, Canata, both of Canada

[73] Assignee: Sybase, Inc., Emeryville, Calif.

[21] Appl. No.: 882,247

[22] Filed: Jun. 25, 1997

Related U.S. Application Data

[63] Continuation of Ser. No. 183,480, Jan. 18, 1994, abandoned.
[51] Int. Cl.$^6$ .................................................. G06F 9/45
[52] U.S. Cl. .................. 395/708; 395/707; 364/280.4; 364/973
[58] Field of Search .................. 395/702, 705, 395/706, 707, 708; 364/973, 280.4

[56] References Cited

U.S. PATENT DOCUMENTS 4,662,290  5/1987  Goss et al. ............................ 364/300
5,452,457  9/1995  Alpert et al. ............................ 395/700

OTHER PUBLICATIONS

Aho et al "Compilers, Principles, Techniques, and Tools", 1986, pp. 1–23.
Pyster, A., "Compiler Design and Construction", 1980, pp. 3–5, 10, 11, 14–19.

*Primary Examiner*—Emanuel Todd Voeltz
*Assistant Examiner*—Michael T. Richey
*Attorney, Agent, or Firm*—John A. Smart; David N. Slone

[57] ABSTRACT

Compilation and virtual machine arrangement and process for translating source code including pre-runtime executable instruction into compiled code having enhanced runtime effectiveness. The source code is formatted in accordance with a user determined and pre-runtime modifiable language definition. The source code is compiled by a generalized compiler and includes executable language specific structure constructs or instructions which pass through the generalized compiler in unexecuted form. The instructions are then executed in a virtual machine which produces compiled code of reduced size, which renders runtime execution of the compiled code of increased effectiveness.

13 Claims, 10 Drawing Sheets

| GRAMMAR/ STRUCTURE DEFINITION | COMPILATION SYNTAX |
|---|---|
| STRUCTURE VARIABLE<br>(<br>  ELEMENT NAME STRING<br>  ELEMENT TYPE STRING<br>  ELEMENT LENGTH INTEGER<br>  ELEMENT FLAGS INTEGER<br>)<br>STRUCTURE INTEGER<br>(<br>  ELEMENT VALUE INTEGER<br>)<br>STRUCTURE FUNCTION<br>(<br>  ELEMENT NAME STRING<br>  ELEMENT PAR_CNT INTEGER<br>  •••<br>) | METHOD XYZ (A INTEGER,<br>               B INTEGER<br>         )<br>{<br>  RETURN ((A+B) * (A-B));<br>} |

*Figure 3*

| TOKEN 1 | TOKEN 2 | TOKEN 3 | TOKEN 4 | TOKEN 5 | TOKEN 6 | |
|---|---|---|---|---|---|---|
| CVM INSTRUCTION | VALUE | CVM INSTRUCTION | VALUE | VALUE | CVM INSTRUCTION | ... |
| _STRUCTURE _DEFINE | "VARIABLE" | _ADD _ELEMENT | "NAME" | "STRING" | _ADD _ELEMENT | ... |
| ... | TOKEN N | TOKEN N+1 | TOKEN N+2 | TOKEN N+3 | TOKEN N+4 | ... |
| ... | INSTRUCTION | VALUE | INSTRUCTION | VALUE | INSTRUCTION | ... |
| ... | PUSH_ VARIABLE | "A" | PLUS | ... | ... | ... |

| ... | TOKEN N | TOKEN N+1 | TOKEN N+2 | TOKEN N+3 | TOKEN N+4 | ... |
|---|---|---|---|---|---|---|
| ... | INSTRUCTION | VALUE | INSTRUCTION | VALUE | INSTRUCTION | ... |
| ... | PUSH_VARIABLE | "A" | PLUS | ... | ... | ... |

↙ 20

STRUCTURES

| | METADATA | DATA 1 | DATA 2 | INTEGERS | METADATA | DATA 1 | DATA 2 |
|---|---|---|---|---|---|---|---|
| VARIABLES | NAME<br>TYPE<br>LENGTH<br>FLAGS | "A"<br>"INTEGER"<br>0<br>18 | "B"<br>"INTEGER"<br>0<br>18 | | VALUE | 127 | 768 |

|  | | SYNTAX | SEMANTICS |
|---|---|---|---|
| DATA MODEL GRAMMAR | S T R U C T U R E S | STRUCT_DEF<br>( "STRUCTURE"<br>    { ALPHA }<br>    "("<br>        <1:0<br>           "ELEMENT"<br>           { ALPHA }<br>           { ALPHA }<br>        ><br>    ")"<br>) | [[ _STRUCTURE_DEFINE ]]<br>[[{ CURRENT_TOKEN }]]<br><br><br><br>[[ _ADD_ELEMENT ]]<br>[[{ CURRENT_TOKEN }]]<br>[[{ CURRENT_TOKEN }]] |
| EVALUATION MODEL GRAMMAR | L A N G U A G E | EXPRESSION<br>(<br>   VARIABLE<br>   OPERATOR<br>   {INTEGER}<br>)<br>ASSIGNMENT<br>(<br>   VARIABLE_REF<br>   "="<br>   EXPRESSION<br>)<br>VARIABLE<br>(<br>   { ALPHA }<br>)<br>OPERATOR<br>(<br>   ("+"<br>   "-"<br>   )<br>)<br>VARIABLE_REF<br>(<br>   { ALPHA }<br>) | <br><br><br>[PUSH_VAL { CURRENT_TOKEN }]<br><br><br><br><br>[ASSIGN]<br><br><br><br>[PUSH_VARIABLE {CURRENT_TOKEN}]<br>[ _STRUCT_INSTANCE VARIABLE]<br><br><br>[PLUS]<br>[MINUS]<br><br><br><br>[PUSH_ADDRESS {CURRENT_TOKEN}] |

*Figure 10* ← 26

COMPILATION AND VIRTUAL MACHINE ARRANGEMENT AND PROCESS FOR SOURCE CODE INCLUDING PRE-RUNTIME EXECUTABLE LANGUAGE STRUCTURE CONSTRUCTS

CROSS-REFERENCE TO RELATED APPLICATIONS

This is a File Wrapper Continuation Patent Application of application Ser. No. 08/183,480, filed Jan. 18, 1994, now abandoned.

This application is related to co-pending patent applications each of them filed on Jan 18, 1994 and having the same inventorship as herein, and respectively entitled "Object Oriented Dispatch and Supercall Process and Arrangement," "Alternate Dispatch Variable Process and Arrangement for Run-Time Message Redirection and Enablement of Selected Object Oriented Methods," and "Variable Resolution Method and Arrangement." These co-pending patent applications have respective Ser. Nos., 08/184,492, 08/183,478, and 08/184,497. These patent applications are assigned to the same assignee as herein, and are incorporated herein by reference in their entirety.

BACKGROUND OF THE INVENTION

This invention relates to compilation and virtual machine arrangements and processes and more particularly to compilation and execution of source code including pre-runtime executable language constructs enabling improved runtime performance.

Software processes running on general purpose computers are typically prepared for runtime execution by a preliminary compilation step which transforms the source code, in whatever form, into an execution manageable file of compilation code which is suitable for execution. It is well-known that general purpose computers are optimized for machine language. Accordingly, one prior art approach entails the compiler translating selected computer programs which are written in high-level languages into an object code form or condition which general purpose computers can effectively comprehend for run-time execution.

The source code or high-level language may be reduced by the compiler to object code in several predetermined passes or steps. These passes may include an intermediate step which involves the production of virtual code, which is temporarily resident in memory but which, after its usefulness has expired, will disappear or be destroyed, as the case may be. The code of this intermediate step, i.e., the virtual code or "pseudocode," as it has also come to be known, is subject to processing by a so-called virtual machine. The virtual machine is essentially no more than specific software in the general purpose computer which is effective for the processing of virtual code.

Virtual machines of course have been known for many years. Such machines execute virtual machine or intermediate instructions and pseudocode rather than real machine code. As, noted, virtual machine code is a temporary code set which is created during compilation as an intermediate stage in preparation for runtime. Moreover, the virtual code is transparent to the user. After production of runtime ready compiled code, the intermediate stage compiler virtual machine code may be, and typically is, erased, archived, or destroyed, depending upon user preference and system needs.

Compilation is thus accomplished to reduce a high level language into assembly or machine code in preparation for efficient and manageable runtime. Compilation may be conducted in multiple stages, for the sake of optimization and efficiency, in order to reduce the high level code. As noted, this may involve the intermediate step of producing virtual code, which is evanescent and has a limited lifetime and which is not retained on disk for permanent storage or any other long term use. However, despite these considerable steps to create greater effectiveness at runtime, the quantity of object code produced for actual execution at runtime may nonetheless be considerable. It is accordingly an object of the invention herein to develop an approach to further reduce the quantity of code which is processed incident to runtime.

It is an additional object of the invention to enable the development of high level language constructs and processes which facilitate compilation of source code into manageable blocks of object code to promote more effective runtime operation.

It is another object of the invention to establish language constructs which facilitate effectiveness in the compilation process which converts source into object code.

In accordance with the invention, it is an object to develop an optimized virtual machine and compiler scheme which improves runtime speed of processing and is more memory efficient than prior art virtual machine schemes and architectures.

SUMMARY OF THE INVENTION

According to the invention herein, the goal of reducing the size of the compiled code and customizing it by use of preselected language structures is established by a two stage source code compilation process. According to the process of the invention, the source code and a compiled language definition are first provided to a generalized compiler effective for producing a compiler virtual machine code set. The source code provided for compilation includes structure constructs which are consistent with a pre-established language definition, to ensure that a standard compilation step is effective for suitably adapting the structure constructs in the source code, so that in tokenized form they are suitably encapsulated to enable staged, hierarchical execution in a post compilation virtual machine step effective for executing instructions which include the source code language constructs. A compiled language definition is established prior to runtime according to predetermined semantics and syntax directed both toward both standard source code expressions and structure constructs effective for handling conventional language expressions during the instruction execution stage implemented by the virtual machine.

According to the invention, the language definition is directed toward the conventional language expressions and structure constructs effective for enabling the handling of conventional language expressions during execution of instructions passing through the generalized compiler step.

More particularly, the language definition is itself compiled and provided to the generalized compiler for assisting with the compilation of the predetermined source code which includes the aforementioned structure constructs, subject to the compiled language definition, according to a first stage of compilation in accordance with the invention. According to a second stage of the invention, the compiler virtual machine code which is produced by the generalized compiler is in turn executed as to executable instructions which have been established and which have passed through the first stage of compilation. By accomplishing this execution of selected instructions prior to runtime, the amount of code that needs to be processed at runtime is considerably reduced, leading to speedier execution and increased process cost effectiveness.

The user inputs the source code through a suitable input/output interface which may include a graphical user interface (GUI) connected to the general purpose computer. The source code is produced by the user according to the preestablished syntax which conforms to the language definition. This language definition is created in a toolmaking process, which permits the user to act as a programmer, in particular as an applications programmer. Further, the definition is conveniently modifiable by the user through a suitable input/output device such as a graphical user interface (GUI) for example. The language definition according to the invention permits the source code to be compiled to include structure constructs which are associated at compilation with tokens representing executable instructions. These executable instructions are then executed by the compiler virtual machine according to the invention herein.

The generalized compiler conducts compilation of the appropriately formatted source code based upon the compiled language definition it has been provided. The source code includes conventional language expressions which are suitably tokenized as well as structure functions which are tokenized as instruction tokens which are executed in the compiler virtual machine to reduce and preprocess the compiler virtual machine code.

A version of the invention herein is directed toward a source code processing system for processing predetermined source code expressions and pre-runtime executable structure constructs established according to a predetermined syntactic and semantic scheme. The source code processing system of the invention includes a language subsystem, a source of source code expressions and pre-runtime executable structure constructs which conform to the syntax and semantics of said language subsystem, and a compilation system connected to said language subsystem which parses and tokenizes the source code, and produces compiler virtual machine code including unexecuted instructions representing pre-runtime executable structure constructs. The invention further includes a compiler virtual machine processing system connected to the compilation system to execute the instructions received from the compiler system.

Further according to the invention, a system is provided within which a data model and an evaluation model are renderable in one or more languages in coordinated fashion permitting behavior to relate to data according to the data model at execution or run time.

These and other features and advantages of the present invention will become apparent upon reading the following detailed descriptions and studying the various figures of the drawings.

DETAILED DESCRIPTION OF THE PREFERRED EMBODIMENTS

Figure 1:
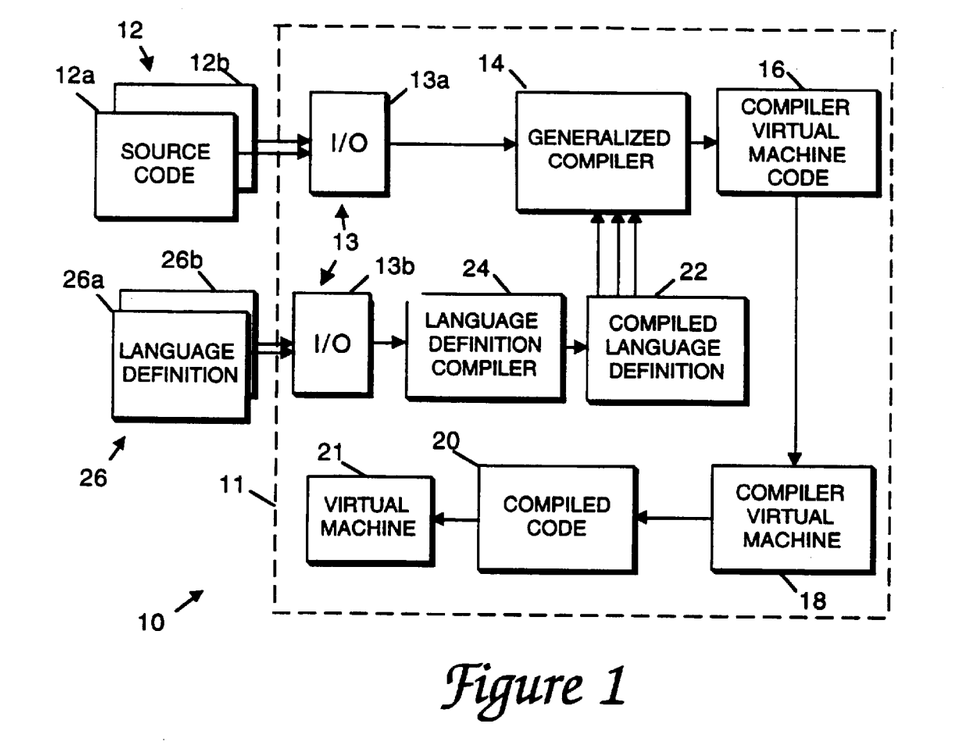
FIG. 1 shows the basic architecture of a language definition and compilation system in accordance with the invention herein, as particularly set forth in diagram form.
Figure 10:
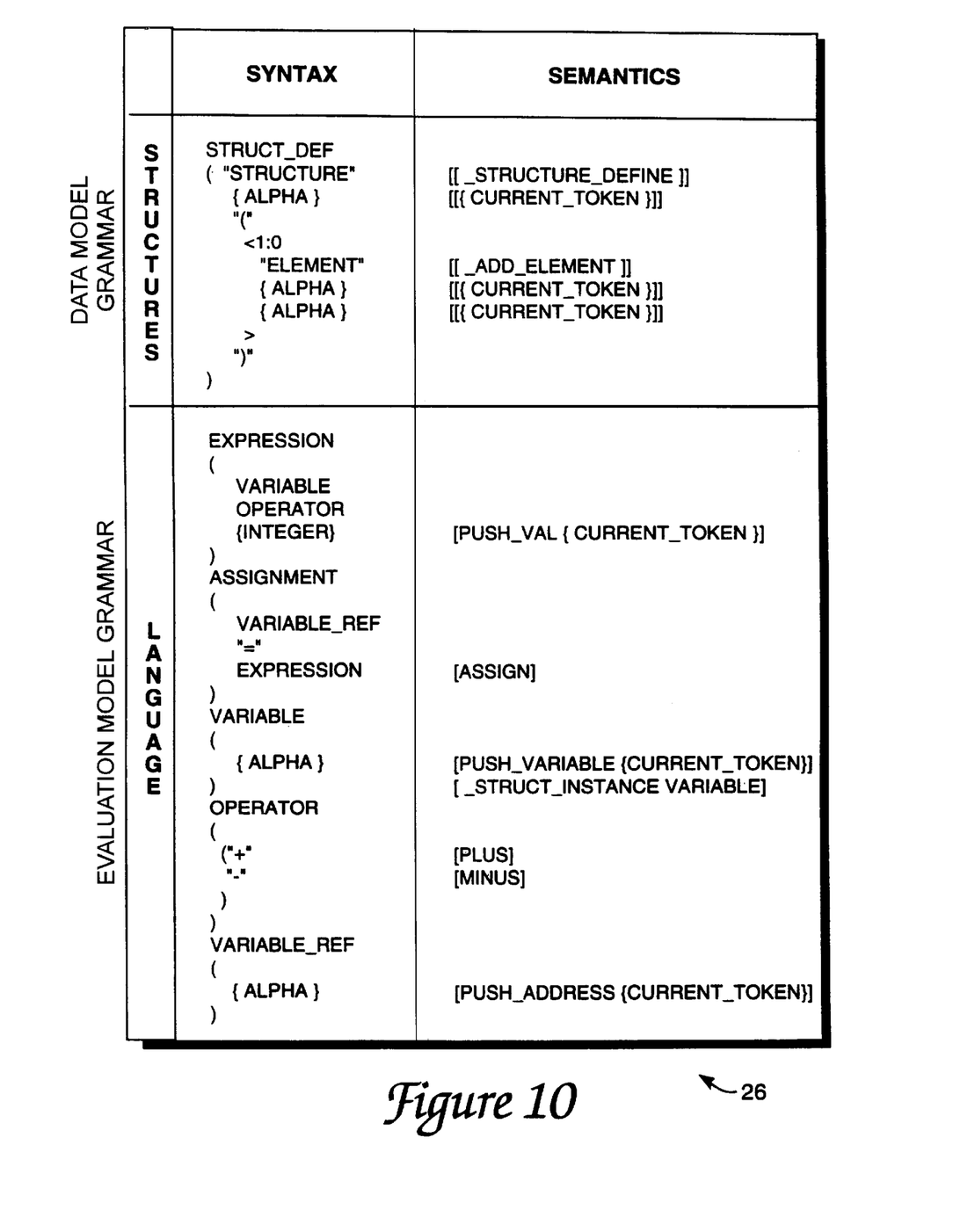
FIG. 10 is a table of the language definition according to the invention.

FIG. 1 shows a compiler and language development virtual machine system 10 which is installed in a general purpose computer 11. This virtual machine system 10 is also referred to as the executing address space, for purposes herein. General purpose computer 11 can for example be a stand-alone or suitably networked personal computer (PC) system, based upon an Intel 80486 microprocessor or the like. A user, who is typically a computer programmer developing an application software program enters source code 12 in one or more blocks, for example source code blocks 12a and 12b into general purpose computer 11 through an input/output device 13 which may for example be a graphical user interface or GUI. Several independent input/output devices may be employed, such as individual input/output devices 13a and 13b, for example. System 10 according to the invention includes a generalized compiler 14 for producing tokens from source code which it receives from the user. In addition to containing user input code, the block of source code 12 received by the generalized compiler 14 includes a file of source code which includes structure definitions such as those expressed in the left column of the table set forth as part of FIG. 3. These structure definitions are compiled with other user supplied source code in generalized compiler 14 to produce the compiler virtual machine code 16 The syntax for structures is shown in FIG. 10, which will be discussed in detail below. Compilation produces the structure source code according to a double square bracket format expressed in FIG. 10. This double square bracket format permits generalized compiler 14 to assign suitable corresponding tokens, which compiler virtual machine 18 can recognize as characterized by different levels of bracketing and thus suitable for execution as instructions of different levels of hierarchy. In each case, the source code is constrained by and subject to the particular language definitions produced by the user, as indicated below.

The generalized compiler 14 produces a block of compiler virtual machine code 16 which includes the token stream created by generalized compiler 14. Additionally, virtual machine system 10 includes a compiler virtual machine 18 which conducts additional processing as will be detailed below upon the block of compiler virtual machine code 16. In particular the compiler virtual machine 18 is effective for processing square brackets and logic statements left unprocessed by the generalized compilation conducted by generalized compiler 14. Finally, virtual machine system 10 includes a block of compiled code 20 which has been produced by compiler virtual machine 18.

As inputs into generalized compiler 14, system 10 requires a block of source code 12 and a compiled language definition 22 for one or more languages which is created by a language definition compiler 24 acting upon a group of language definitions 26 including for example first and second language definitions 26a and 26b, as will be discussed in detail below. The compiled language definition 22 specifies syntax, semantics, and structures for each selected language in terms of data and behavior, which permits production of an optimized form of compiled code 20 in a two-step process according to the invention which includes the action of generalized compiler 14 and the compiler virtual machine 18. The thereby optimized compiled code runs more quickly during runtime in virtual machine 21, permitting pursuit of applications which heretofore could not be implemented at all and further speeds the completion of processing of already implementable processes and applications. At runtime, an interpretation of the expressions of data references is performed during the execution of methods.

Figure 2:
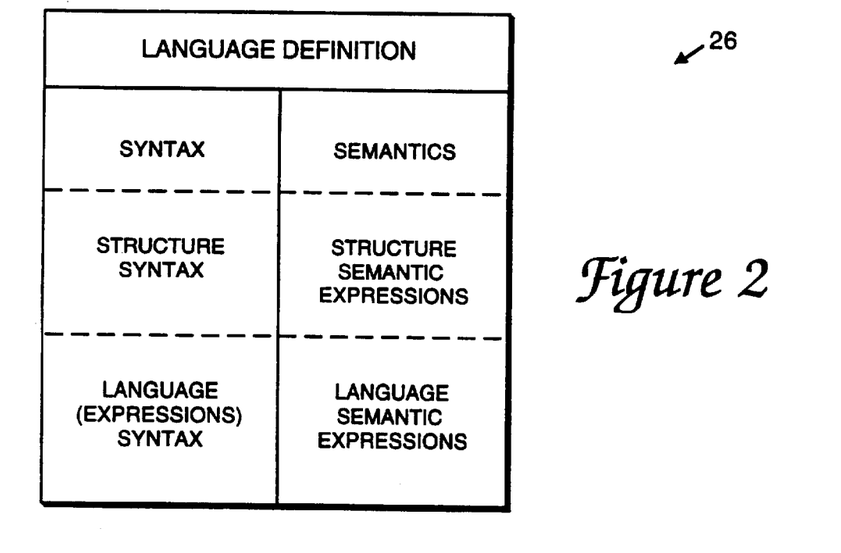
FIG. 2 illustrates the language definition according to the invention herein which enables operation of the compiler arrangement discussed below.

FIG. 2 indicates in table form the key elements and structures of each language definition 26 according to the invention herein. A particular language definition 26 created in connection with the invention has first and second features, expressed as adjacent columns, below the table name LANGUAGE DEFINITION. The first feature of a language definition 12 is expressed in a column labeled SYNTAX and the second feature of the language definition 12 is expressed in a column labeled SEMANTICS. In particular, FIG. 2 expresses two major aspects of language definition in accordance with the invention. These two major aspects of the language definition include a syntax description of the structure elements and the language expressions (i.e., the syntax of the language definition 26) of the language created in accordance with the invention, and the semantic relationship or "grammar" between these structure elements, between these language expressions, and between the structure elements and the language expressions (i.e., the semantics of the language definition 26). This will further be elaborated below in greater detail as will be seen below with respect to FIG. 10.

Figure 3:
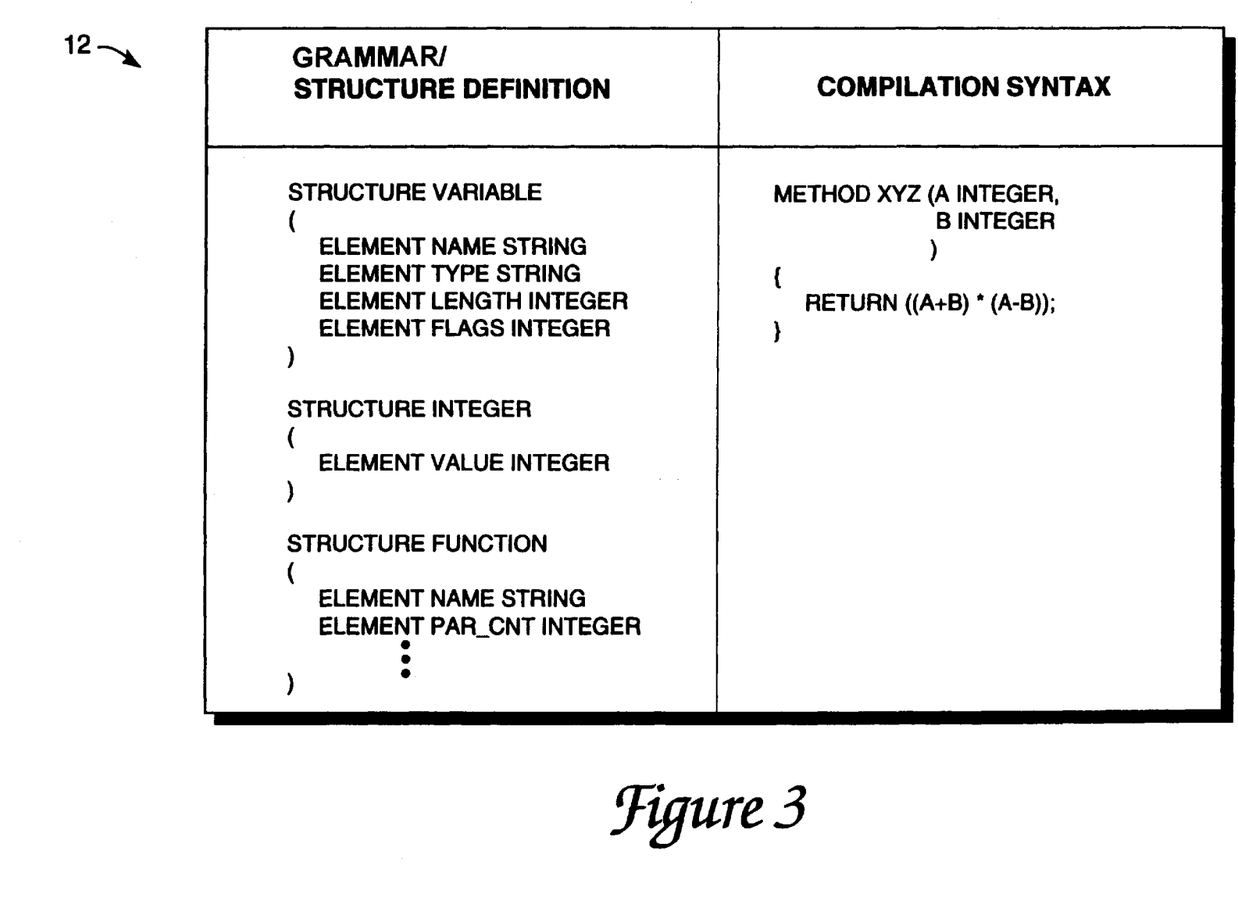
FIG. 3 illustrates the source code definition employed in connection with the invention herein.

FIG. 3 sets forth in tabular form, selected structure definitions (in column one) for kinds of source code to be entered by the user through a graphical user interface, keyboard, or other input/output device prior to runtime. Additionally, FIG. 3 sets forth (in column two) an example of a compiled source code function, called "METHOD XYZ," according to the syntax requirements set forth in FIG. 10 and in the accompanying text. More particularly, column two in FIG. 3 sets forth the "COMPILATION SYNTAX," the postprocessed form of source code from source code block 12.

The source code entered by the user is expressed in source code block 12 permits the user directly to create structures and expressions and to react to the effects of their creation and processing on the GUI interface itself. In particular, the source code in the block of source code 12 can exhibit a structure definition in accordance whether the structure defined as a STRUCTURE VARIABLE, in which case the structure includes an opening parentheses bounding an element name string, an element type string, an element length string, and an element flags integer. This combination is encapsulated by a closing parentheses. If the particular source code structure is a STRUCTURE INTEGER, the parentheses simply bound an element value integer. If the source code structure is a STRUCTURE FUNCTION, then the parentheses bind in sequence a plurality of element name strings, and element PAR_CNT integers.

FIG. 3 further shows in its right column an example of particular source code to be compiled. The source code in this instance is a particular method, i.e., METHOD XYZ, which is a function of two integer variables, A and B:

```
METHOD XYZ (A INTEGER, B INTEGER)
    )
{
    RETURN ((A+B)*(A-B));
}.
```

This compiled source code exhibits a certain post-compilation syntax consistent with the expected compilation syntax of structure functions, as stated in the left-hand column of FIG. 3 setting forth a structure definition for applicable portions of the block of source code 12 set forth in FIG. 1, and which is consistent with the language definitions set forth in FIG. 10. The syntax, as indicated, requires that the function, "METHOD XYZ," which is a function of two integer variables, A and B, be expressed in a terms of open and closed parentheses surrounding the integer variable names followed by an indication of their status as integers, for each such integer variable, each of them separated by commas. Additionally, within brace brackets, the function represented by the method, i.e., RETURN ((A+B)*(A−B)) is set forth.

Figure 4:
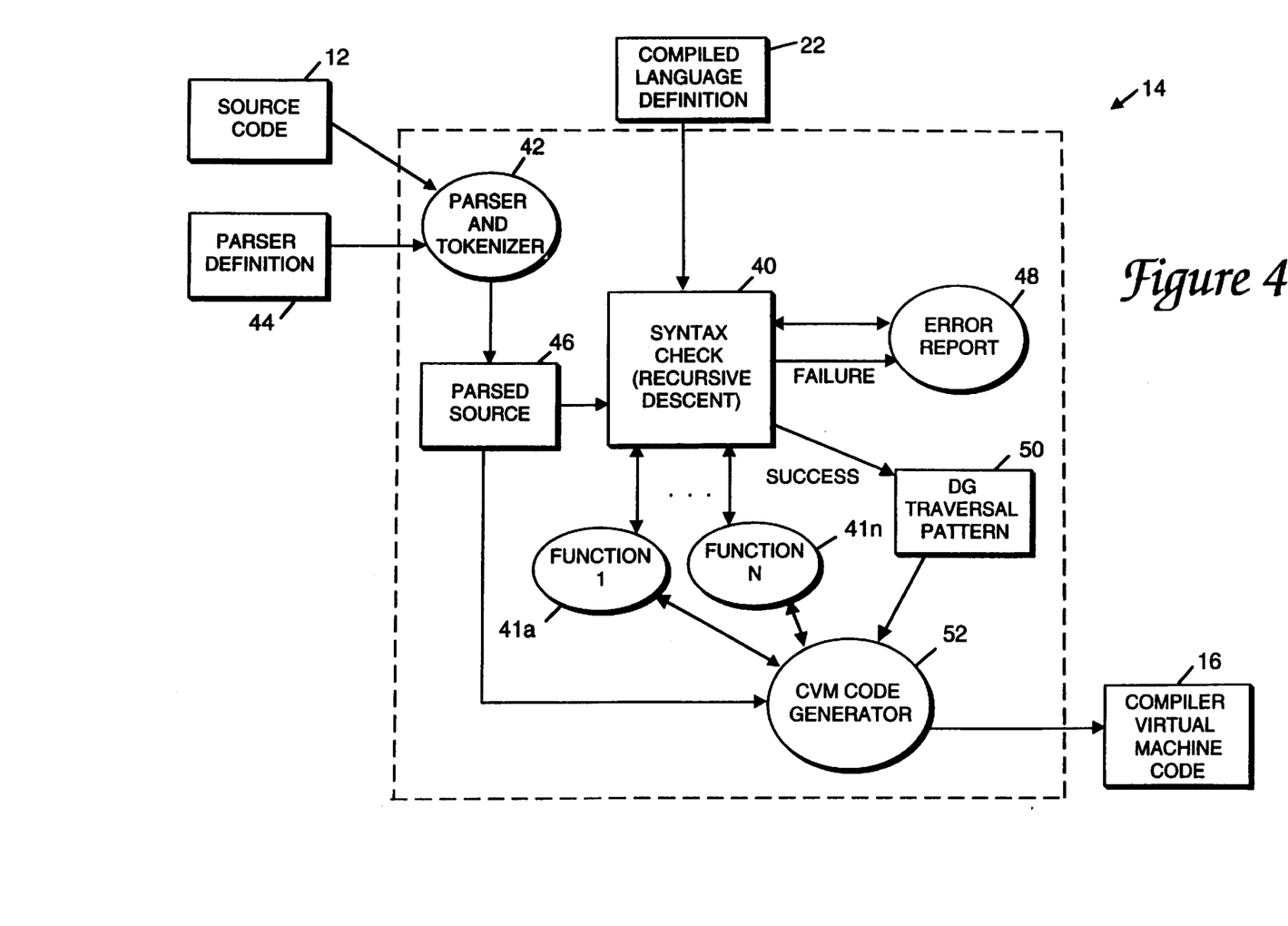
FIG. 4 shows the generalized compiler according to the invention.

FIG. 4 shows details of the generalized compiler 14 (or compilers) in diagram form. The compiler(s) are effective to translate one or more languages into virtual machine code and into the executing address space within which the compiler(s) reside as well. More particularly, the generalized compiler 14 is shown in FIG. 4 to receive source code from source code block 12 which has been produced by the user at a suitable user interface, e.g., preferably a GUI interface. Generalized compiler 14 performs a syntax check on received source code in syntax checker 40 which operates on parsed code. The source code for generalized compiler 14 is received by a parser/tokenizer 42 operating according to conventional parser definitions well-known to one skilled in the art which are applied by parser definition element 44. The resultant parsed and tokenized source code is next stored in a parsed source location 46 able to produce the parsed and tokenized source code for evaluation by syntax checker 40 in accordance with a known process of recursive descent known to those skilled in the art. In accordance with the syntax check performed, indicated processes or functions 41a through 41n, corresponding to FUNCTIONS 1-N in FIG. 4, are conducted on associated parsed syntax elements. In the event of failure with respect to the syntax check, an error report 48 is prepared. A DG traversal pattern 50 is established in accordance with block 50. Finally, compiler virtual machine code generator 52 is established effectively to receive an input from parsed source output 46, functions 41a–41n, and DG traversal pattern 50.

Accordingly, generalized compiler 14 produces compiler virtual machine code 16 from compiler virtual machine code generator 42.

Figure 5:
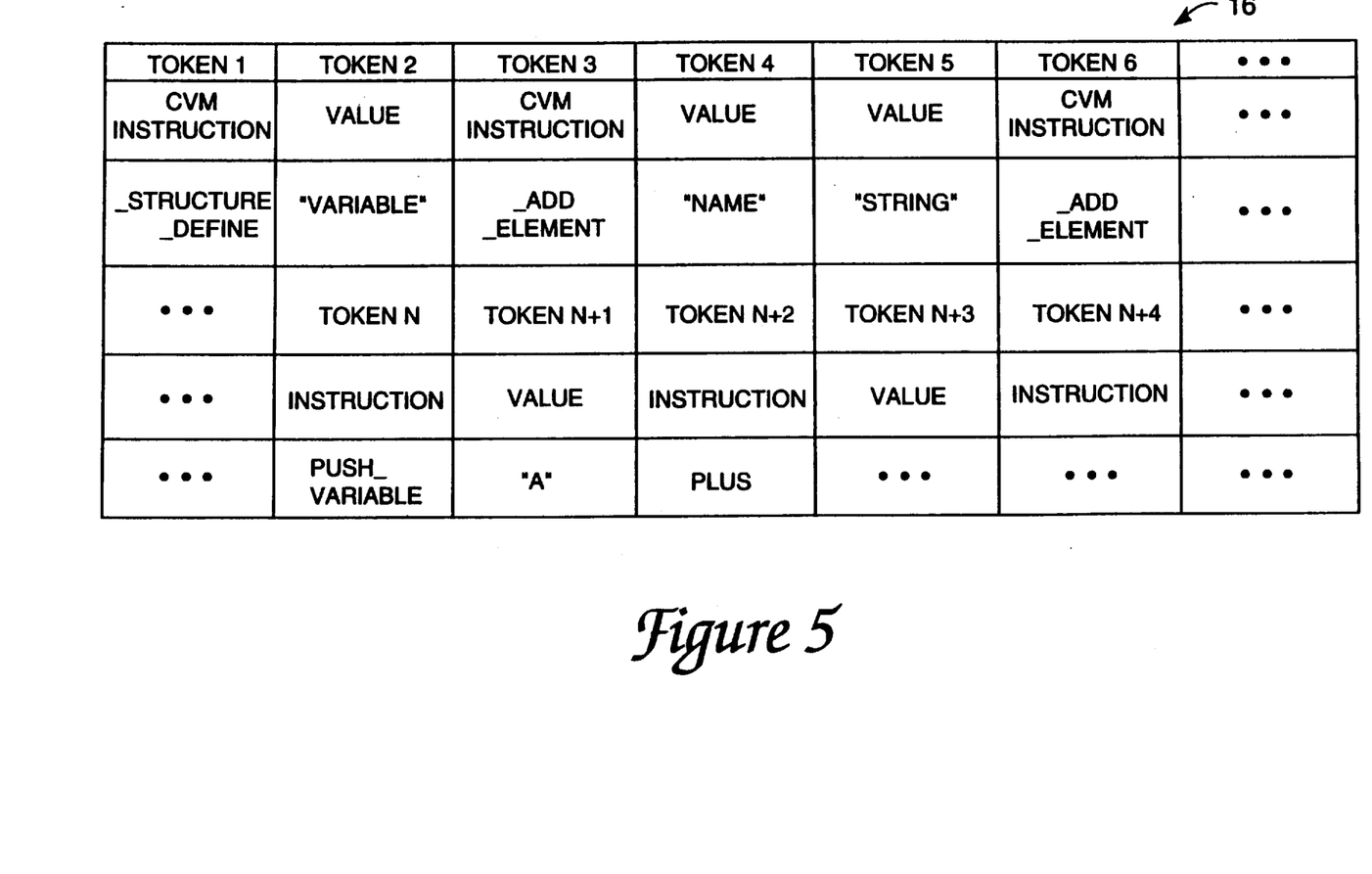
FIG. 5 expresses the compiler virtual machine code produced by the generalized compiler.

FIG. 5 expresses the variably tokenized compiler virtual machine code 16 produced by the generalized compiler 14 in response to receipt of source code 12 and compiled language definition 22. In particular, FIG. 5 is a symbol table showing examples of tokens making up or comprising the compiler virtual machine code 16. As shown, there are many different kinds of tokens associated with the compiler virtual machine code 16 generated by the generalized compiler 14. FIG. 5 shows as many as "N+4" tokens in the symbol table, based upon an arbitrary integer number N. Specifically stated, a token is a selected integer number corresponding to a particular kind of code. For example, a particular integer can be selected to represent the first token, i.e., token 1. The kind of code assigned to token 1 in the example of FIG. 5 is a "compiler virtual code (CVM) instruction code," called a __STRUCTURE_DEFINE code. Another kind of code represented in the symbol table of FIG. 5 is VALUE code. VALUE code includes such classes of code as "VARIABLE," "NAME," and "STRING" classes, as suggested in FIG. 5 respectively with reference to tokens 2, 4, and 5. Other kinds of CVM code include -ADD__ELEMENT, __PUSH_VARIABLE, and PLUS, as shown in FIG. 5. These particular kinds of code are considered to be INSTRUCTION code types. Moreover, all of the above indicated kinds of code are examples of token code types.

Figure 6:
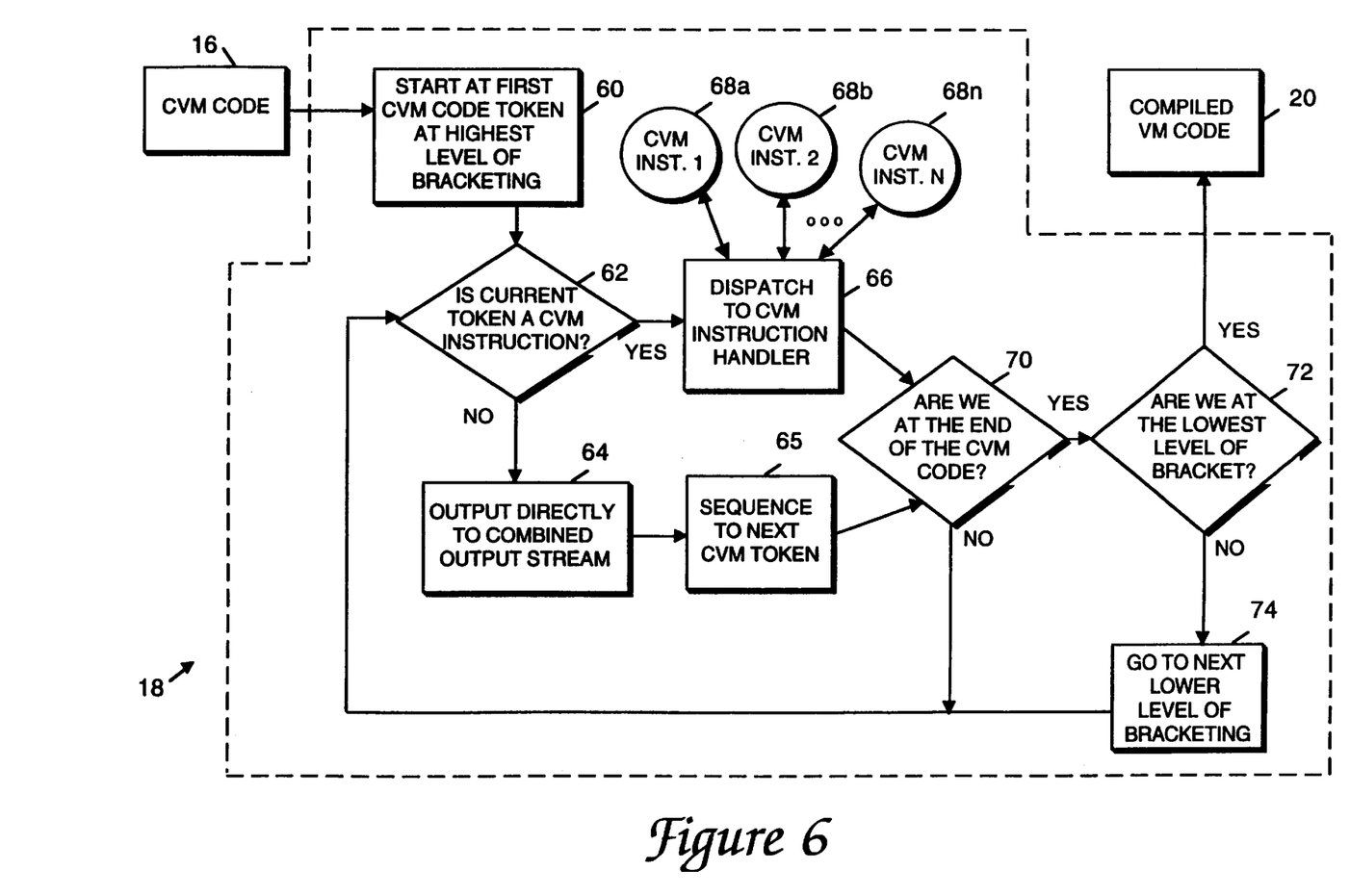
FIG. 6 shows the compiler virtual machine according to the invention herein.

FIG. 6 shows functional details of compiler virtual machine 18 in diagram form, according to the invention herein. As already noted above, compiler virtual machine 18 is effective for creation of compiled virtual machine code 20, based upon the compiler virtual machine code 16 which it receives as its input. The process of compiler virtual machine 18 begins with a first in order compiler virtual machine code token which is at the highest level of bracketing, in accordance with block 60. As will be discussed with reference to FIG. 10, structure constructs which are executable instructions are at a relatively high level of bracketing, permitting them priority of processing. Thus, at decision block 62, a determination is made whether the current token is a compiler virtual machine instruction. If the current token does not represent an instruction which is to be executed, the current token is output directly to a combined output stream, as suggested at block 64. After completion of output directly to the combined output stream as per block 64, a sequence is taken to the next compiler virtual machine token. If the current token in a compiler virtual machine instruction, then the current token is dispatched to a compiler virtual machine instruction handler according to block 66. Compiler virtual machine instruction handlers 68a–68n are effective for performing a predetermined array of kinds of instruction programming and are designated as respective CVM INSTRUCTIONS 1-N. After processing has been completed by compiler virtual machine instruction handlers 68a–68n, a determination is made at decision block 70 as to whether the process has reached the end of the compiler virtual machine code 16. If not, then a return is made to decision block 62, for operation in connection with a next in order current token. If the end of the particular level of compiler virtual machine code 16 has been reached, then a check is conducted in accordance with decision block 72 regarding whether operation is at the lowest bracket level. If not, according to block 74 operation proceeds by going to a next lower level of bracketing with a return to decision block 62 for continued operation at the next lower level of bracketing. However, if operation is already at the lowest bracketing level, then establishment of compiled virtual machine code 20 will have been completed.

Figure 7:
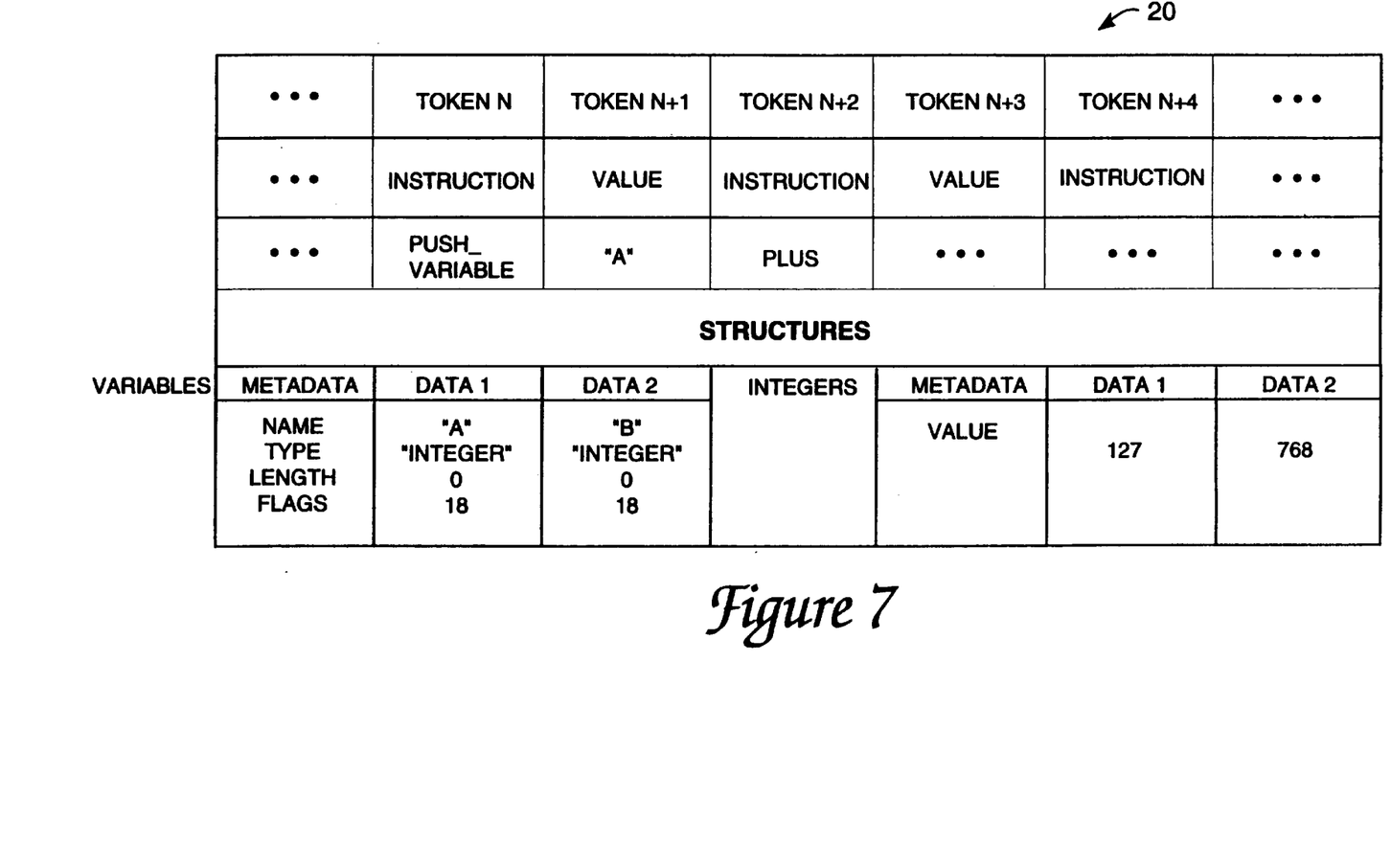
FIG. 7 shows the compiled code produced in accordance with the invention herein.

FIG. 7 shows the compiled code 20 which may be produced in connection with the invention herein. In particular, FIG. 7 shows instances of instruction code including for example __PUSH_VARIABLE and PLUS. All of the above indicated kinds of code are examples of token code. Another kind of compiled code includes structures, as illustrated in the lower section of FIG. 7. In particular, the code produced includes structures of two kinds: variable structures and integer structures. Variable structures in the compile code include variables and integers. The variable structures have metadata categories respectively of name, type, length, and number of flags. The integer structures have only a single metadata category, value. In FIG. 7, two variables, "A" and "B" are shown, and both are variables of type "INTEGER." The length of an integer variable is indicated to be zero, or "0." Integer variables are indicated to have eighteen flags. Integer structures are indicated to have integer values. Two examples of possible integer values are indicated in FIG. 7. These are "127" and "768." The compiler virtual machine 18 is effective for executing instructions which passed through generalized compiler 14. The result is to establish the already executed metadata structures of FIG. 7, which creates advantages at runtime, because there is accomplished a considerable advance in speed due to the pre-execution of certain instructions.

Figure 8A:
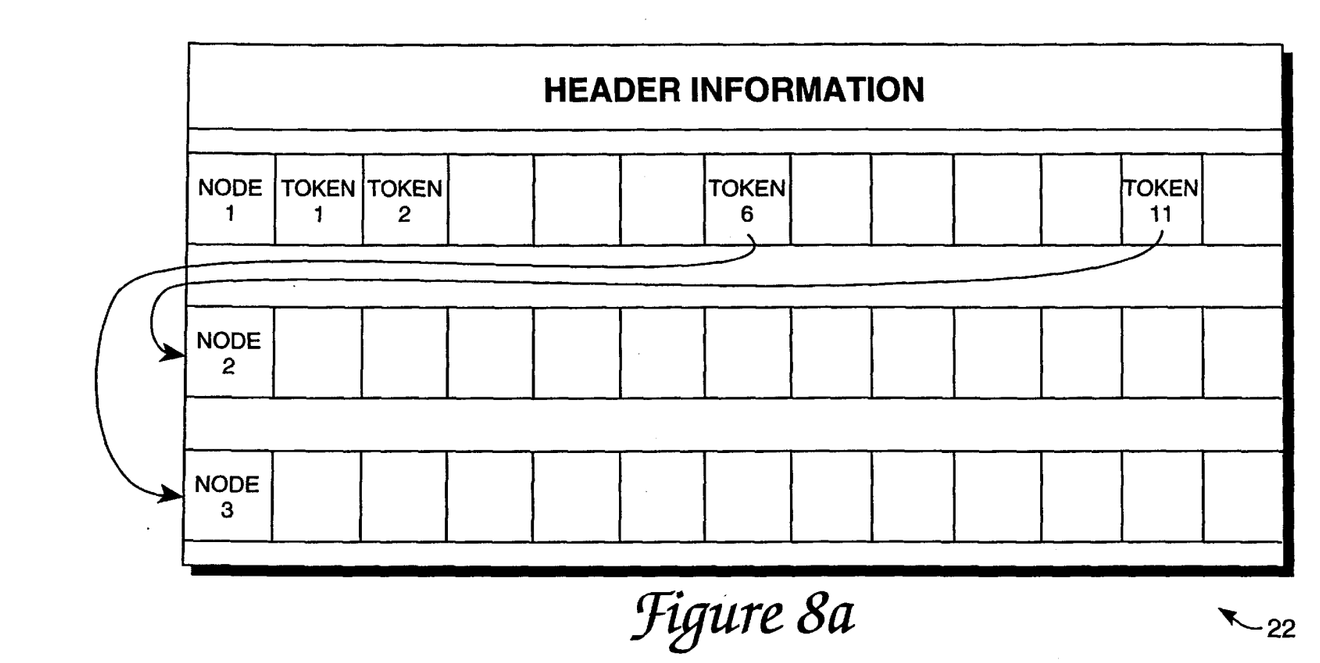
FIG. 8a shows the compiled language definition employed by the generalized compiler to compile the source code from source code block.

FIG. 8a shows the compiled language definition 22 employed by the generalized compiler 14 to compile the source code from source code block 12. As FIG. 8a shows, the compiled language definition 22 includes a plurality of nodes. In the example shown, three nodes are indicated, NODE 1, NODE 2, and NODE 3. Each node contains a plurality of tokens, for example tokens 1 through 11. In the example shown, token 6 of NODE 1 indicates a link between NODES 1 and 3. Further, token 11 of NODE 1 indicates a link between NODES 1 and 2. Simply stated, NODE 1 is directed toward both NODE 2 and NODE 3.

Figure 8B:
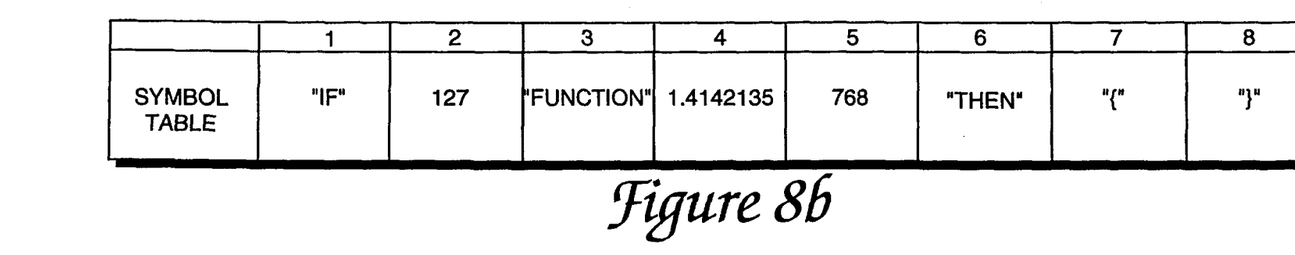
FIG. 8b is a symbol table relating to the compiled language definition of FIG. 7.

FIG. 8b is a symbol table relating to the compiled language definition 22 of FIG. 8a. A first token is the alphanumeric expression "IF." A second token is the integer number 127. Another token is the expression "FUNCTION." Another token represents the number 1.4142135. A next token represents the positive integer 768. Yet another token represents the expression "THEN." Another token represents the open brace {and another the close brace}. Each token corresponds to a different number.

Figure 8C:
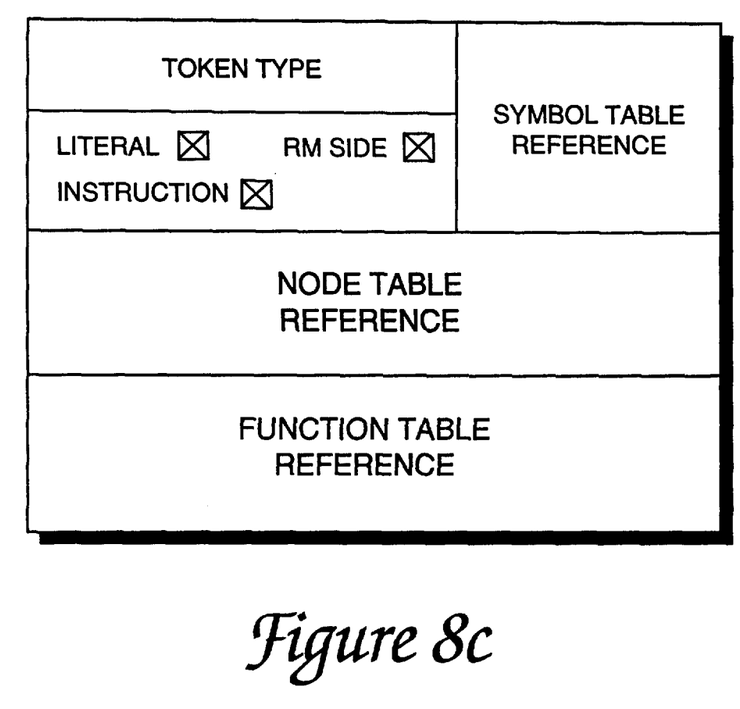
FIG. 8c is a symbol table reference with respect to the compiled language definition of FIG. 7.

FIG. 8c is a symbol table reference with respect to the compiled language definition 22 of FIG. 8a. The symbol table reference includes an indication of the type of token, which may be a literal token, an instruction token, or a right margin (RM) token. Each symbol has a particular node table reference number and a function table reference number.

Figure 9:
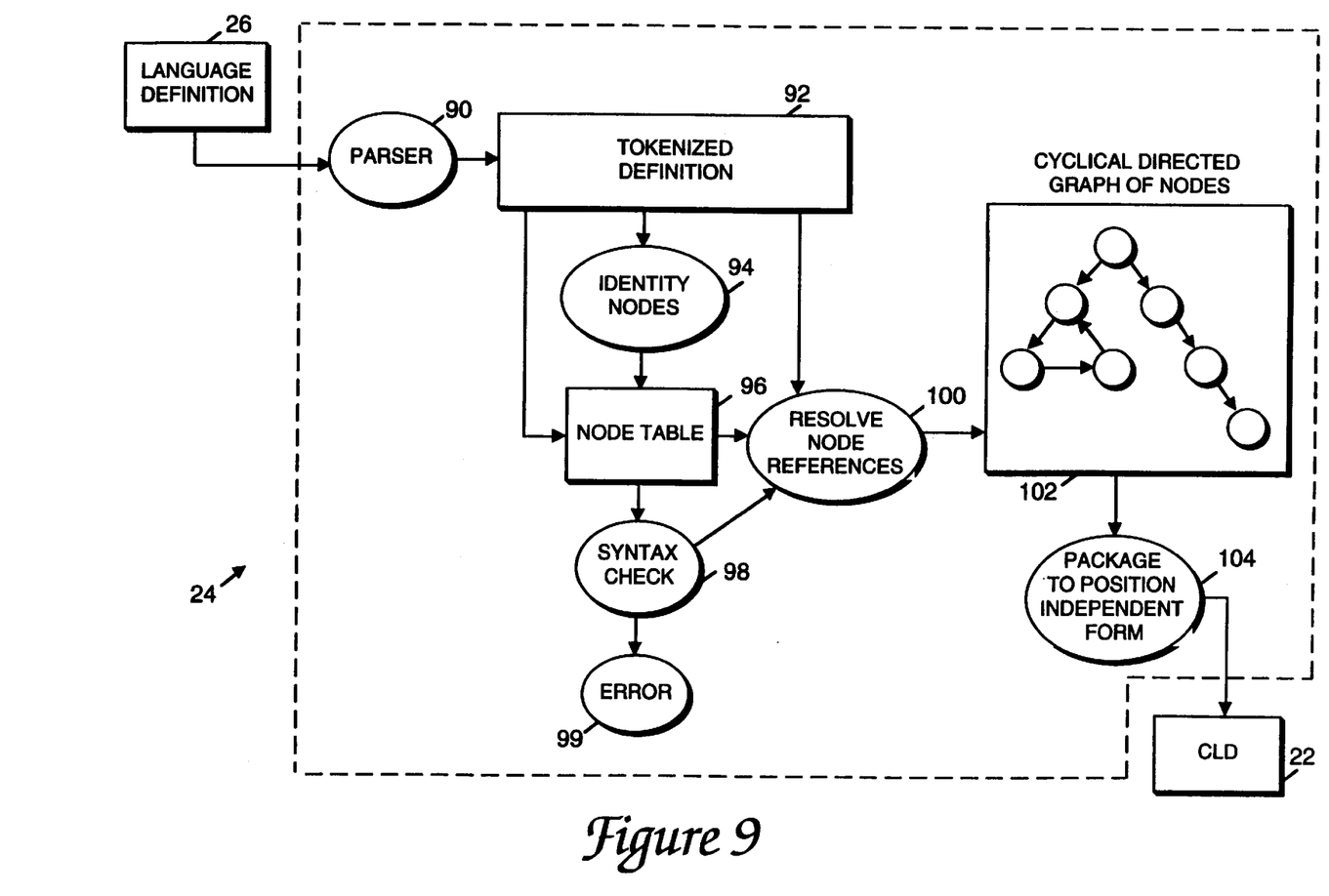
FIG. 9 illustrates the language definition compiler according to the invention herein.

FIG. 9 illustrates the language definition compiler 24 according to the invention herein. In particular, language definition compiler 24 receives as its input language definition 26. Then, the language definition compiler 24 transforms the input language definition 26 into a compiled language definition 22 (CLD). This is accomplished by parsing the input language definition received from language definition 26. The parsing is accomplished by a parser 90 indicated in FIG. 9 as an input oval from language definition 26. Language definition 26 will be discussed in greater detail in connection with FIG. 10 below. By parsing, it is meant that the elements of the structures and language expressed in the syntax of the language are resolved into separate components. Each parsed language element and structure is tokenized by tokenized definition block 92. Tokenization is the association of a particular language element portion or structure element with a predetermined token integer number representing the particular kind of language element portion. As an example in connection with FIG. 10, and as will be expressed in greater detail below, the structure element "STRUCTURE" is associated with the token semantic [[__STRUCTURE_DEFINE]] which in turn has an integer number associated with it. FIG. 8a illustrates the expression of particular nodes as tokens expressed in terms of numerical integer values.

Language definition compiler 24 in FIG. 9 further includes a process for identifying nodes 94 from tokenized definitions 92 which are produced by a parser 90 receiving language definition 26 in ASCII, for example. Once the nodes are identified according to oval 94 set forth in FIG. 9, these nodes are entered as information into a node table 96. A syntax check is undertaken according to oval 98 to determine conformance of each node with the syntax required of the particular structure or language element, as set forth in FIG. 10. The syntax check oval procedure 98 may result in an error according to block 99, which results either in termination or resolution of the error identified. Particular node references are resolved in accordance with the resolve node references procedure represented by oval 100. Next, a cyclical directed graph of nodes is established as suggested at block 102. This cyclical directed graph of nodes is packaged in position independent form, as suggested at oval 104. Finally, the result of the position independent form data is provided to block 22 as a compiled language definition (CLD) which represents a compiled interrelationship of nodes useful for compilation by generalized computer 14.

FIG. 10 is a table of the language definition 26 according to the invention. The language definition 26 is expressed in two categories, syntax and semantics. Additionally, the language definition is directed toward structures (or structure constructs) and standard language elements or expressions. For example, as FIG. 10 shows, the syntax of a STRUCT_DEF is open parentheses (, the word STRUCTURE in quotes, the open brace {, a selected alphanumeric character string indicating the kind of structure, a close brace }, an open parentheses ( in quotes, one or more instances of the word ELEMENT in quotes followed by two open close brace combinations each bounding another selected alphanumeric character string, a close parentheses character in quotes, and another close parentheses character. The semantics associated with the indicated structure definition is a number of double square bracketed expressions, the first of which includes the expression _STRUCTURE_DEFINE in double square brackets. Next, again in double square brackets and additionally in braces is the token number associated with the token expression CURRENT_TOKEN. Then, for each of the one or more instances of the word ELEMENT, the expression _ADD_ELEMENT is provided in double square brackets. Finally, after each _ADD_ELEMENT double square bracketed item, follow two similarly double bracketed token expressions of the kind CURRENT_TOKEN, enclosed in open and close braces.

The language definition 26 of FIG. 10 further is expressed in terms of the same two categories, syntax and semantics with respect to standard language elements. For example, as FIG. 10 shows, the syntax and semantics of a plurality of language elements are expressed in detail. The language elements expressed in terms of syntax and semantics include the categories of EXPRESSION, ASSIGNMENT, VARIABLE, OPERATOR, and VARIABLE_REF.

The language element EXPRESSION in FIG. 10 has the syntax of open parentheses (, the word VARIABLE OPERATOR, and in double open and close braces the word INTEGER followed by close parentheses ). The associated semantics related to the language element EXPRESSION is the expression in single square brackets PUSH_VAL and in double open and close braces the value of the token number associated with the expression CURRENT_TOKEN.

The language element ASSIGNMENT in FIG. 10 has the syntax of open parentheses (, the word VARIABLE_REF, and in double open and close quotes the expression= followed by the name of a particular selected expression, followed by close parentheses ). The associated semantics related to the language element ASSIGNMENT is the expression bounded in open and close square brackets of the value of ASSIGN.

The language element VARIABLE in FIG. 10 has the syntax of open parentheses (, the value of the expression ALPHA set between open and close braces, followed by close parentheses ). The associated semantics related to the language element VARIABLE are the successive first and second expressions in single square brackets: PUSH_VARIABLE and in double open and close braces the token number associated with the expression CURRENT_TOKEN, and _STRUCT_INSTANCE VARIABLE.

The language element OPERATOR in FIG. 10 has the syntax of open parentheses (, and each in succession in double open and close quotes the two expressions + and –, followed by close parentheses ). The associated semantics related to the language element OPERATOR are the expressions bounded in open and close square brackets of the tokens PLUS and MINUS, respectively.

The language element VARIABLE_REF in FIG. 10 has the syntax of open parentheses ( the expression in double open and close braces of the word INTEGER followed by close parentheses ). The associated semantics related to the language element VARIABLE_REF are the expression in single square brackets PUSH_ADDRESS and in double open and close braces the token number associated with the expression CURRENT_TOKEN.

In summary, the invention herein is effective for the more highly effective compilation of source code in according to selected language definitions permitting the establishment of instruction structures which pass through a screening compilation stage and are executed at a subsequent compilation step which provides virtual compilation and a reduced set of compiled code for more efficient runtime operation. The invention is directed toward a compilation and virtual machine arrangement and process for translating source code including pre-runtime executable instruction into compiled code having enhanced runtime effectiveness. The source code is formatted in accordance with a user determined and pre-runtime modifiable language definition. The source code is compiled by a generalized compiler and includes executable language specific structure constructs or instructions which pass through the generalized compiler in unexecuted form. The instructions are then executed in a virtual machine which produces compiled code of reduced size, which renders runtime execution of the compiled code of increased effectiveness.

In summary, the invention is directed toward method of processing source code constrained by preselected language definitions and including predetermined pre-runtime executable language specific structure constructs. The method of the invention includes processing predetermined source code constrained by a predetermined language definition including predetermined language expressions and pre-runtime executable language specific structure constructs, in order to produce a compiler virtual machine code which includes unexecuted instructions reflecting the pre-runtime executable language specific structure constructs. The method further includes processing the produced compiler virtual machine code to produce compiled code for runtime execution. The effect of this is improved runtime processing. This method may further include making modifications to the predetermined source code on a graphical user interface (GUI) up to and including runtime, or making modifications to the language definition on a graphical user interface up to and including runtime. The method of the invention further includes, according to one version, executing the pre-runtime executable language specific structure constructs. The method may further include, under the invention, employing the language definition is employed to structure said predetermined source code. Further under the invention, the source code processing is conducted by a generalized compiler. Further, the invention includes as a feature compiling the language definition to produce a compiled language definition prior to processing the predetermined source code. Additionally, processing the source code includes parsing and tokenizing the source code.

The invention further includes a source code processing system for processing predetermined source code expressions and pre-runtime executable structure constructs established according to a predetermined syntactic and semantic scheme. The system includes a language subsystem for establishing a syntactic and semantic scheme according to which source code can be prepared for compilation according to the predetermined syntactic and semantic scheme. It includes a source of source code expressions and pre-runtime executable structure constructs, the form of the pre-runtime executable structure constructs and expressions conforming to the syntax and semantics of said language subsystem. Further, the system includes a compilation system connected to the language subsystem and the source of source code. The compilation system is effective for parsing and tokenizing said predetermined source code, and being effective to produce compiler virtual machine code including unexecuted instructions representing said pre-runtime executable structure constructs. The system further includes a compiler virtual machine processing system connected to the compilation system and receiving compiler virtual machine code including unexecuted instructions from the compilation system. The compiler virtual machine processing system is effective for executing executable instructions received from said compiler system. Consequently, compiled code is produced which enables enhanced runtime execution. The compilation system is further effective for encapsulating pre-runtime executable structure constructs within predetermined characters effective for establishing a processing hierarchy to be observed by the compiler virtual machine processing system. The system includes an arrangement for making modifications in the source code. This arrangement may include a graphical user interface and a computer monitor. The language system preferably includes a language definition compiler which is effective for producing a compiled language definition. The language definition compiler includes a parser for parsing input language definition information. The language definition compiler further includes a tokenizer for tokenizing language definition information. The language definition compiler includes a node identifier. According to the invention, the language definition information is parsed, tokenized, node-identified, set in a node table, resolved as to node references subject to a syntax check, and established in a cyclical directed graph of nodes for packaging into position independent form as a compiled language definition.

The invention herein further addresses a semantic resolution mechanism for receiving expressions and their semantic relationships. This mechanism includes an arrangement for structuring predefined semantic relationships, which is effective to establish semantic structures defining relationships between received expressions. The mechanism further includes a source of expressions and defined semantic relationships conforming to established semantic structures applicable to received expressions. The source of expressions and defined semantic relationships produces executable instructions for handling selected expressions in accordance with methods for enabling interaction between said expressions. The mechanism further includes an arrangement for parsing, tokenizing, and segregating expressions from received expressions and defined semantic relationships, this arrangement for parsing, tokenizing, and segregating being effective for producing intermediate virtual expressions and instructions for executably interrelating said intermediate virtual expressions. The mechanism additionally includes a system for receiving said intermediate virtual expressions and instructions, the system for receiving being effective for recognizing the virtual expressions and instructions and being effective for output producing the virtual expressions and executing the virtual instructions in prioritized fashion. The arrangement for parsing, tokenizing, and segregating is effective for delimiting virtual instructions in prioritized manner. The system for receiving recursively executes said virtual instructions in accordance with the level of delimitation set by said means for parsing, tokenizing, and segregating. The system for receiving includes an instruction handler effective for dispatching virtual instructions to a suitable instruction handling mechanism selected from a predetermined set of instruction handling mechanisms.

Further, the invention is directed toward a system comprising a data model and an evaluation model, each separately expressed in one or more languages and effective for permitting behavior to relate to data according to the data model at run time.

While this invention has been described in terms of several preferred embodiments, it is contemplated that many alterations, permutations, and equivalents will be apparent to those skilled in the art. It is therefore intended that the following appended claims be interpreted as including all such alterations, permutations, and equivalents as fall within the true spirit and scope of the present invention.

What is claimed is:

1. A source code processing system for processing predetermined source code that includes expressions and pre-runtime executable structure constructs established according to a predetermined syntactic and semantic scheme, comprising:

(a) a language subsystem for establishing a syntactic and semantic scheme according to which source code can be prepared for compilation according to the predetermined syntactic and semantic scheme, (b) a source of code expressions and pre-runtime executable structure constructs, the form of said expressions and said pre-runtime executable structure constructs conforming to the syntax and semantics of said language subsystem, (c) a compilation system connected to said language subsystem and said source of source code, said compilation system being effective for parsing and tokenizing said predetermined source code, and being effective to produce compiler virtual machine code including compiled instructions representing said expressions and uncompiled instructions representing said pre-runtime executable structure constructs; and (d) a compiler virtual machine processing system connected to said compilation system and receiving compiler virtual machine code including said compiled instructions representing said expressions and said uncompiled instructions representing said pre-runtime executable structure constructs from said compilation system, said compiler virtual machine processing system being effective for executing said uncompiled instructions representing said pre-runtime executable structure constructs received from said compiler system.

2. The source code processing system according to claim 1, wherein said compilation system is effective for encapsulating pre-runtime executable structure constructs within predetermined characters effective for establishing a processing hierarchy to be observed by said compiler virtual machine processing system.

3. The source code processing system according to claim 1, further comprising means for making modifications in said source code.

4. The source code processing system according to claim 3, wherein said means for making modifications in said source code includes a graphical user interface and a computer monitor.

5. The source code processing system according to claim 1, wherein said language system comprises a language definition compiler effective for producing a compiled language definition.

6. The source code processing system according to claim 5, wherein said language definition compiler includes a parser for parsing input language definition information.

7. The source code processing system according to claim 1, wherein said language definition compiler includes a tokenizer for tokenizing language definition information.

8. The source code processing system according to claim 1, wherein said language definition compiler includes a node identifier.

9. The source code processing system according to claim 1, wherein language definition information is parsed, tokenized, node-identified, set in a node table, resolved as to node references subject to a syntax check, and established in a cyclical directed graph of nodes for packaging into position independent form as a compiled language definition.

10. A semantic resolution mechanism for receiving expressions and their semantic relationships, comprising:

(a) a mechanism for structuring predefined semantic relationships, said mechanism being effective to establish semantic structures defining relationships between received expressions, (b) a source of expressions and defined semantic relationships conforming to established semantic structures applicable to received expressions, said source of expressions and defined semantic relationships including executable instructions for handling selected expressions in accordance with methods for enabling interaction between said expressions, (c) means for parsing, tokenizing, and segregating expressions from received expressions and defined semantic relationships, said means for parsing, tokenizing, and segregating being effective for producing intermediate compiled virtual expressions and uncompiled virtual instructions for executably interrelating said intermediate virtual expressions, and (d) means for receiving said intermediate virtual compiled expressions and uncompiled instructions, said means for receiving being effective for recognizing said virtual compiled expressions and virtual uncompiled instructions and being effective for output producing said virtual compiled expressions and executing said virtual uncompiled instructions in prioritized fashion.

11. The semantic resolution mechanism of claim 10, wherein said means for parsing, tokenizing, and segregating is effective for delimiting virtual instructions in prioritized manner.

12. The semantic resolution mechanism of claim 10, wherein said means for receiving recursively executes said virtual instructions in accordance with the level of delimitation set by said means for parsing, tokenizing, and segregating.

13. The semantic resolution mechanism of claim 10, wherein said means for receiving includes an instruction handler effective for dispatching virtual instructions to a suitable instruction handling mechanism selected from a predetermined set of instruction handling mechanisms.

* * * * *